United States Patent [19]

Martin et al.

[11] Patent Number: 5,340,967
[45] Date of Patent: Aug. 23, 1994

[54] METHOD FOR STORING AND DISPENSING CASH

[75] Inventors: Patrick G. Martin, Plano; Tod G. Franklin, Dallas, both of Tex.

[73] Assignee: Tidel Engineering, Inc., Dallas, Tex.

[21] Appl. No.: 977,510

[22] Filed: Nov. 17, 1992

Related U.S. Application Data

[63] Continuation-in-part of Ser. No. 765,085, Sep. 19, 1991, Pat. No. 5,220,157.

[51] Int. Cl.⁵ .............................................. G06F 15/30
[52] U.S. Cl. .................................... 235/379; 235/375; 235/382
[58] Field of Search ....................... 235/379, 375, 382; 902/22

[56] References Cited

U.S. PATENT DOCUMENTS 3,593,881 7/1971 Paap .
4,375,032 2/1983 Uchida ................................ 235/381

OTHER PUBLICATIONS

VeriFone, Inc., "A Powerful Transaction Microcomputer As Easy To Use As An Automated Teller Machine," Aug. 1989 (pp. 2).

Primary Examiner—Harold Pitts
Attorney, Agent, or Firm—David H. Judson

[57] ABSTRACT

A time delayed cash dispenser is interconnected with a control terminal that is connectable to an electronic funds transfer system. The control terminal is selectively controlled to "override" the timer of the time delayed cash dispenser to enable a user to access and perform transactions through the EFT system. Preferably, the control terminal activates the cash dispenser to vend cash containers containing the authorized cash disbursement. Cash stores in the time delayed cash dispenser are replenished by depositing excess cash from the retail location cash register. The system thus permits cash replenishment in discrete amounts without exposing the entire cash stores and permits a retail establishment to sell cash to customers through the EFT system.

6 Claims, 2 Drawing Sheets

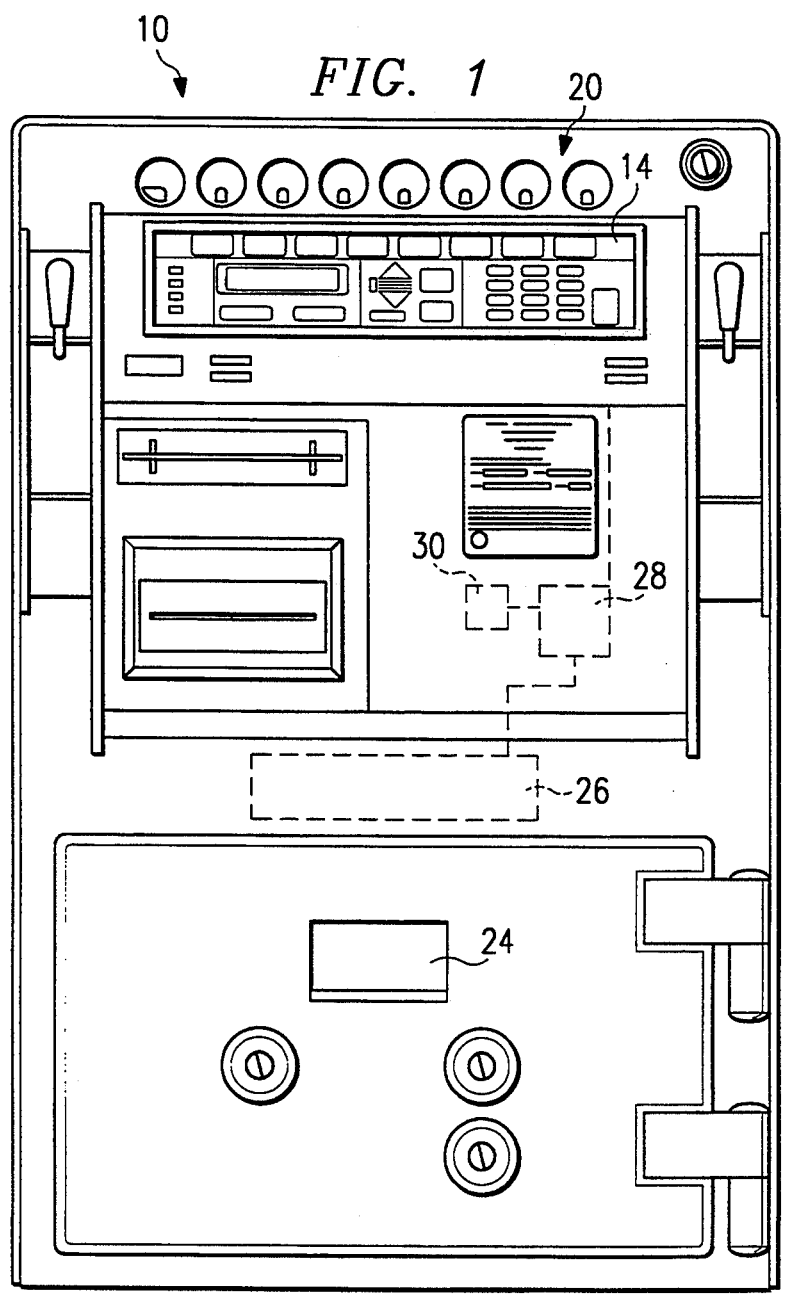
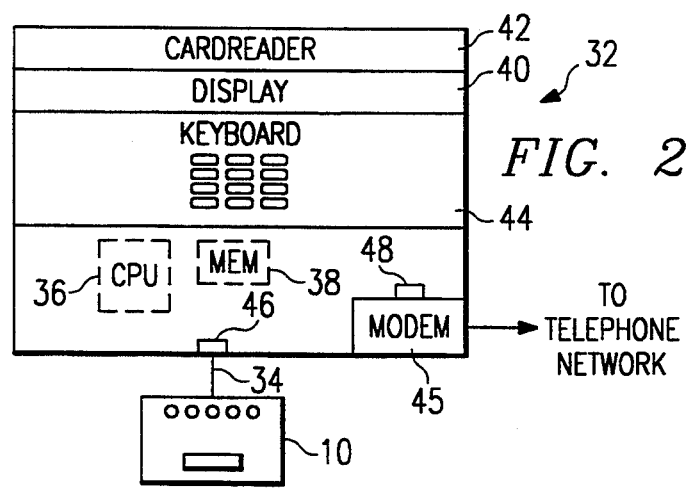

and now U.S. Pat. No. 5,220,157, issued Jun. 15, 1993.

METHOD FOR STORING AND DISPENSING CASH

This application is a continuation-in-part of prior copending application Ser. No. 07/765,085, filed Sep. 24, 1991, entitled "Scrip Controlled Cash Dispensing System", now U.S. Pat. No. 5,220,157, issued Jun. 15, 1993.

TECHNICAL FIELD

This invention relates to cash control and management and to currency dispensing systems. More particularly, the invention relates to methods and apparatus for storing currency in individual cash containers and dispensing the cash containers on command after authorization and verification from an electronic funds transfer host financial transactional computer.

BACKGROUND OF THE INVENTION

It is well known in the art to use an automated teller machine (ATM) operable at all hours to satisfy needs for dispensing cash at unmanned remote locations. The convenience of ATMs has made them extremely popular with the general public. Moreover, retail merchandisers have found that the on premise location of an ATM attracts customers who then tend to make cash purchases. Thus, the presence of an ATM tends to increase sales.

ATMs typically transmit and receive transaction authorization and verification information to and from an electronic funds transfer ("EFT") host financial transaction computer over conventional telephone lines. Accordingly, such devices may be conveniently placed and operated at almost any desired remote location. Unfortunately, an ATM is quite expensive. Furthermore, the supply of cash in an ATM must be periodically replenished, which is usually accomplished by an armored car service. Such servicing further increases the cost of ATM operation. Because of purchase and service costs, ATMs are not economically practical except at locations which attract relatively high use.

Retail establishments such as convenience stores, retail fuel sales outlets and the like handle large volumes of cash and are thus quite prone to robbery, employee theft, etc. To address this problem, cash management systems that employ a device known as a time delayed cash dispenser have become widely used to prevent such cash losses. Time delayed cash dispensers comprise a safe-like container for containing cash packaged in known amounts in small containers such as wrappers, tubes or the like. Cash is periodically removed from the retail establishment's cash register and placed in the containers which are then deposited in vend columns of the time delayed cash dispenser for safekeeping. The cash containers cannot be removed from the time delayed cash dispenser except by activation of the apparatus to dispense one container at a time. Furthermore, the apparatus can only be activated to permit withdrawals on a time delayed basis. Thus, once the machine has been activated to dispense one container, it cannot be activated to dispense another container until a pre-set time period has elapsed. Accordingly, even though the apparatus may contain a significant amount of cash at any one time, the attendant must account for each deposit and withdrawal and withdrawals can only be made at predetermined timed intervals.

As described above, ATMs and time delayed cash dispensers perform basically different functions for basically different purposes. However, both satisfy a distinct need for which the operator/user must pay a cost. Except for the cost, it would be desirable to locate an ATM at each location that has a time delayed cash dispenser.

BRIEF SUMMARY OF THE INVENTION

It is an object of the present invention to provide a novel cash management system to facilitate the efficient and secure dispensing of cash.

It is a further object of the present invention to provide a cash management system in which a time delayed cash dispenser is selectively controlled to dispense predetermined amounts of cash on demand to thus emulate an ATM.

It is yet a further object to provide a cash management system that provides the benefits of an ATM without the attendant cost and complexity of prior art systems. The invention further provides a method of operating a time delayed cash dispenser to obtain the advantages of an ATM for an investment cost of only slightly more than a time delayed cash dispenser.

It is still another object of the invention to describe improvements to a time delayed cash dispenser apparatus to enable the cash dispenser to emulate an ATM yet have the further advantage of facilitating local cash replenishment of the dispenser by the operator of the retail establishment.

In the preferred embodiment, the invention is a method of storing and dispensing cash using a time delayed cash dispenser located in a retail establishment where customers frequenting the establishment purchase goods using cash. The time delayed cash dispenser is connectable to an electronic funds transfer system via a telephone network and includes input means such as a cardreader and keyboard, an inlet for receiving discrete cash containers, an outlet, and a vend mechanism that normally vends individual containers from the outlet in response to a vend command signal generated only at predetermined time intervals. According to the method, selected quantities of cash are organized in discrete cash containers and the cash containers are placed into the inlet of the time delayed cash dispenser. The cash dispenser is then ready for use by customers seeking to obtain cash withdrawals. To obtain cash, the customer requests a specific transaction authorization from an electronic funds transfer system. Typically the request is made by swiping a bank or credit card through the cardreader and entering a personal identification number into the keyboard.

The method continues by determining whether confirmation of the specific transaction authorization has been received from the electronic funds transfer system. If so, an electronic command signal is generated for activating the vend mechanism to dispense a discrete cash container irrespective of whether the predetermined time interval has lapsed. Thus the time delay of the cash dispenser is selectively controlled or overridden to enable the dispenser to emulate an ATM. By using a time delayed cash dispenser, however, the method has the further advantage of enabling periodical replenishment of the dispenser's cash stores using excess cash received at the retail establishment. The system thus permits cash replenishment in discrete amounts without exposing the entire cash stores and permits a retail establishment to sell cash to customers through the EFT system.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 1 is a block diagram of the conventional time delayed cash dispenser according to the prior art;

FIG. 2 is a block diagram of a modified time delayed cash dispenser according to the teachings of the present invention.

Similar reference characters refer to similar components throughout the several views of the drawings.

DETAILED DESCRIPTION

Figure 3:
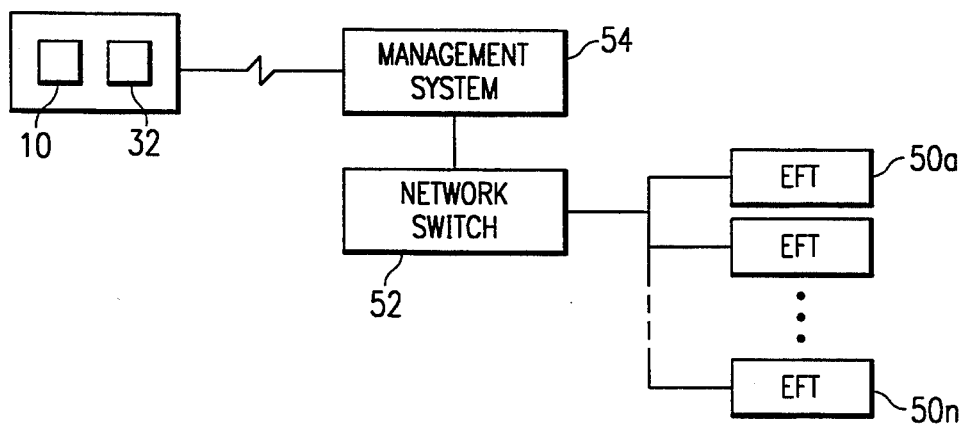
FIG. 3 is a block diagram detailing how the time delayed cash dispenser of FIG. 2 is connectable to an electronic funds transfer system to facilitate cash or other transactions.

Referring now to FIG. 1, a block diagram is shown of a conventional time delayed cash dispenser 10. Cash dispenser 10 is known in the prior art and functions as an electrically automated safe that is programmed to dispense predetermined amounts of money at predetermined times. Such dispensers are available commercially under the trademark TACC® from Tidel Engineering, Inc. of Carrollton, Tex. The cash dispenser comprises a housing 12 having a control panel 14, The control panel includes a number of control elements such as a keyboard for enabling the operator to enter information and program the device. The dispenser includes an inlet 20 for receiving discrete cash containers, an outlet 24, and a vend mechanism 26 that normally vends individual tubes or containers from the outlet in response to a vend command signal generated at predetermined time intervals. The vend mechanism includes a plurality of vend columns in which various increments of cash are deposited through the inlet. A controller, such as a digital signal processor 28, is controlled by appropriate software routines stored in memory 30 to effect the generation of the vend command signal. The processor 28 is programmable through the input means to vary the operating characteristics, such as the time delay, of the dispenser. One such time delayed cash dispenser is a totally programmable cash handling system of the type manufactured by Tidel Engineering, Inc. of Carrollton, Tex. under the trademark TACC-EFM. A dispenser of the same general configuration is also shown in U.S. Pat. No. 3,593,881, titled "Time And Money Controlled Vending Depository," which is incorporated herein by reference.

According to the present invention, the time delayed cash dispenser of FIG. 1 is "modified" to emulate an ATM. Referring now to FIG. 2, the cash dispenser 10 is connected to a transaction control terminal 32 via an RS-232 connection 34. The transaction control terminal 32 includes a microprocessor 36, associated memory 38, a display 40, a cardreader 42, a keyboard 44, a modem 45 and two (2) peripheral ports 46 and 48. One of the ports 46 is connected via the RS-232 line to the cash dispenser while the other port connects the modem 45 to a telephone network. The time delayed cash dispenser 10 is thus connectable (via the control terminal) to an electronic funds transfer ("EFT") system as will be described. One such control terminal is the Verifone Pinstripe III terminal made and sold by Verifone, Inc. of Redwood City, Calif.

Although not shown in FIG. 2, it should be appreciated that one or more of the various components of the control terminal 32 may not be required if the cash dispenser includes certain input and output devices. Thus, for example, if the cash dispenser includes a cardreader, the cardreader 42 of the terminal 32 may be omitted.

Referring now to FIG. 3, the EFT system generally includes one or more participating financial institutions 50a . . . 50n that are accessed through a telephone network switch 52. A management computer system 54 may be used to monitor system communications, to log transactions and authorizations, to control routing, and to provide management reports. As described above, the terminal 32 accesses the telephone network over a dedicated phone line (preferably using the CompuServe network and Visa protocol). The terminal operates in an unmanned fashion and a typical customer transaction occurs as follows. The customer approaches the terminal and follows operational instructions displayed at the terminal to complete a transaction. After the transaction selection is complete, the customer swipes his card through the cardreader 42 and may enter a PIN through the keyboard 44. The desired amount of cash is then also entered. Conventional prompting schemes and the like are used for this purpose.

After the transaction selection is complete, the card swiped, the amount and PIN entered, the terminal dials the EFT system to process the transaction. The computer system 54 analyzes the transaction and routes it to the appropriate financial network for authorization. Upon receipt of a reply, the transaction is logged for reporting, settlement and fee payment, then routed back to the terminal for further processing. The terminal receives the transaction reply and, if the transaction is authorized, generates a command signal. The command signal is provided over the RS-232 link connected to the cash dispenser and serves to activate the vend mechanism irrespective of the time delay set. The predetermined amount of cash is then vended to the customer.

In the preferred embodiment, a method is described for storing and dispensing cash using a time delayed cash dispenser located in a retail establishment where customers frequenting the establishment purchase goods using cash. Using the control terminal, the time delayed cash dispenser is connectable to an electronic funds transfer system. The control terminal includes suitable input means such as a cardreader and keyboard. The cash dispenser includes an inlet for receiving discrete cash containers, an outlet, and a vend mechanism that normally vends individual containers from the outlet in response to a vend command signal generated at predetermined time intervals. According to the invention, selected quantities of cash are first organized in discrete cash containers and the cash containers are placed into the inlet of the time delayed cash dispenser. A customer seeking cash then requests specific transaction authorization from his or her EFT system. A determination is then made by the control terminal whether confirmation of the specific transaction authorization has been received from the electronic funds transfer system. If so, an electronic command signal is generated by the terminal for activating the vend mechanism to dispense a discrete cash container irrespective of whether the predetermined time interval has lapsed.

As is readily evident, the system of the invention is comprised of conventional hardware assembled, interconnected and operated to interface with and utilize existing electronic funds transfer systems and to permit on-site terminal-initiated control of the cash dispenser for immediate withdrawal of any authorized amount of cash. The system permits immediate cash withdrawal from cash stores in a time delayed cash dispenser, thus providing many of the advantages of an ATM without the attendant cost. Instead of using a complete ATM, however, relatively inexpensive cash dispenser equipment is controlled as described to provide many of the functions of an ATM. This system operated in accordance with the invention can be installed and operated at a fraction of the cost of installing and maintaining an ATM. Moreover, modification of a time delayed cash dispenser to dispense cash on demand permits the cash dispenser to serve the dual role of a secure cash drop and a device which vends cash on demand (after EFT authorization and verification) in the manner of an ATM.

Because the system dispenses cash from a safe drop which is continuously re-loaded on site by the retail establishment attendant, the cost and inconvenience of armored car service loading of an ATM is obviated and the risks attendant to opening the machine for cash installation are totally eliminated. Instead, the attendant replenishes cash stores by depositing excess cash from the cash register. Thus the location, such as a convenience store or the like in which the system is installed, provides for its customers all the advantages of an ATM without suffering the purchase and service costs of an ATM. Furthermore, the location enjoys all the benefits of having an on-premise ATM (such as increased customer traffic, immediate cash availability for impulse purchases, etc.) as well as the advantages of having a safe drop for safekeeping of cash on premises. The system provides the additional advantage of recirculating cash. Instead of storing cash in a safe or the like for later removal for banking, etc., the location-collected cash is continuously resold to cash customers via the electronic funds transfer system.

According to the invention, customers of the retail establishment use a conventional bank debit card or credit card to access an electronic funds transfer system through the control terminal and perform cash withdrawals from a cash account or cash advances against an approved credit account. The terminal, with respect to the electronic funds transfer system, transmits and receives electronic funds transfer (EFT) information. The terminal then issues a programmed command to the cash dispenser which responds by vending cash containers from the vend columns of the cash dispenser. Thus the system of the invention provides the ability to utilize the electronic funds transfer system to perform a transaction resulting in cash dispensing at a remote location without using an expensive ATM. By equipping time delayed cash dispensing apparatus to perform in accordance with the invention, the merchant/operator obtains all the advantages of an on-site ATM (e.g. increased customer traffic, etc.) without the attendant investment cost. Furthermore, because cash stores in the time delayed cash dispenser are continuously replenished by the local attendant/operator, the expense and risk of servicing an ATM are avoided and the merchant obtains the added advantage of recirculating cash on-site by selling cash directly to a participating financial institution via the electronic funds transfer system.

Figure 4:
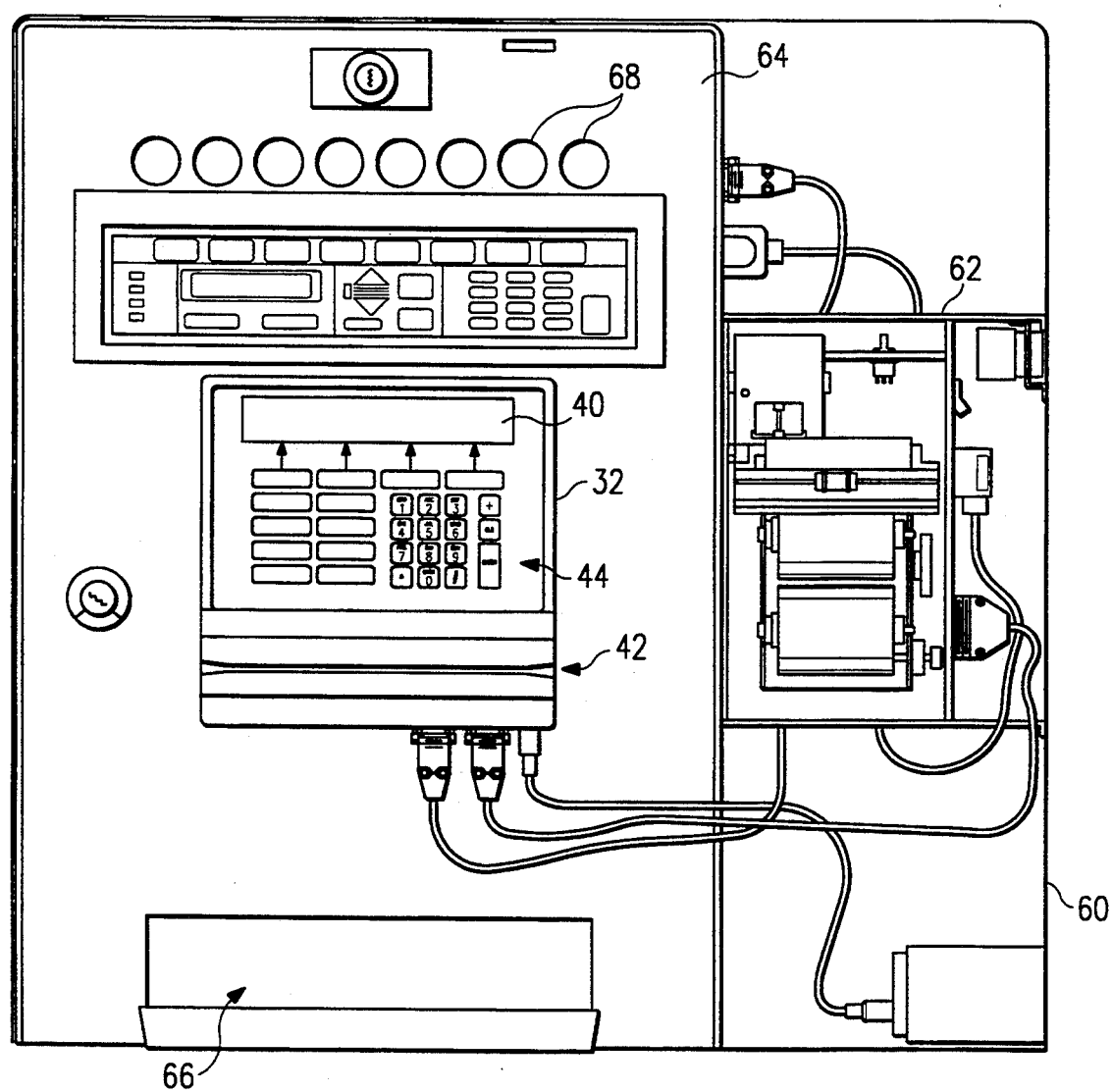
FIG. 4 is a representation of the preferred embodiment of the invention with an access cover removed.

The control terminal and the time delay cash dispenser may be physically separated or they may be located in the same housing as best seen in the preferred embodiment of FIG. 4. As seen in this figure, the safe portion of the time delay cash dispenser is omitted so that the unit fits into a housing 60 along with a journal printer 62. The cash dispenser 64 is situated so that the outlets of the vend columns are conveniently accessible to the user through a single large opening 66 at the bottom of the unit. The inlets 68 to the vend columns are readily accessible to store personnel when the access hatch (not shown) is opened. The access hatch has an opening through which the control terminal 32 is received. The control terminal includes the cardreader 42, keyboard 44 and display 40 as previously described.

It will be recognized that since the terminal 32 communicates with both the EFT system and the dispenser, the terminal may be programmed to query the dispenser before completing the EFT transaction to determine if the dispenser contains sufficient cash stores to satisfy the disbursement command. Alternatively, if the EFT transaction is completed before discovering that the dispenser contains insufficient cash to satisfy the transaction, the dispenser can be programmed to automatically access the EFT and cancel the unfulfilled transaction.

While the invention has been described with specific reference to dispensing cash from a time delayed cash dispenser, it will be recognized that other conventional ATM functions which do not involve cash dispensing may be performed by the control terminal described. For example, the terminal may be programmed to initiate other conventional EFT operations such as savings to checking transfers, checking to savings transfers, etc.

If desired, a paper insert (e.g., a merchandise coupon) can be inserted into a vend tube to enable the system to vend coupons or other paper materials with cash. Likewise, a paper tube (which may be overprinted to form a coupon or the like) can be used to retain the cash instead of a vend tube.

While the invention has been described with particular reference to use of specific commercially available components, the invention is not limited to use of these particular components. As will be understood by those skilled in the art, various devices may be assembled and programmed to perform the unique functions of the invention. It is to be understood, therefore, that the forms of the invention described in detail are to be taken as preferred embodiments thereof and that various changes and modifications may be resorted to without departing from the spirit and scope of the invention as defined by the appended claim.

What is claimed is:

1. Apparatus for storing and dispensing cash, comprising:
a time delayed cash dispenser connectable to an electronic funds transfer system via a telephone network and including input means, an inlet for receiving discrete cash containers, an outlet, and a vend mechanism that normally vends individual containers from the outlet in response to a vend command signal generated at predetermined time intervals; and a transaction control terminal connected to the time delayed cash dispenser and including control means for requesting a specific transaction authorization from the electronic funds transfer system, determining whether confirmation of the specific transaction authorization has been received from the electronic funds transfer system, and if confirmation of the specific transaction authorization has been received, producing an electronic command signal for activating the vend mechanism to dispense a discrete cash container irrespective of whether the predetermined time interval has lapsed.

2. A method of storing and dispensing cash using a time delayed cash dispenser located in a retail establishment where customers frequenting the establishment purchase goods using cash, the time delayed cash dispenser being connectable to an electronic funds transfer system via a telephone network and including input means, an inlet for receiving discrete cash containers, an outlet, and a vend mechanism that normally vends individual containers from the outlet in response to a vend command signal generated at predetermined time intervals, comprising the steps of:

(a) instructing a customer to enter account information through the input means of the time delayed cash dispenser;

(b) dialing the electronic funds transfer system through a telephone line to request specific transaction authorization from the transfer system;

(c) determining whether confirmation of the specific transaction authorization has been received from the electronic funds transfer system; and (d) if confirmation of the specific transaction authorization has been received, producing an electronic command signal for activating the vend mechanism to dispense a discrete cash container irrespective of whether the predetermined time interval has lapsed.

3. The method as described in claim 2 further including the step of:

(e) periodically replenishing the time delayed cash dispenser using excess cash received at the retail establishment.

4. The method as described in claim 3 wherein the account information is entered by the customer pulling a card through a cardreader of the input means.

5. The method as described in claim 4 wherein the card is a bank card.

6. The method as described in claim 4 wherein the card is a credit card.

* * * * *